United States Patent [19]

Shiga et al.

[11] Patent Number: 4,696,979
[45] Date of Patent: * Sep. 29, 1987

[54] PROCESS FOR PRODUCING PROPYLENE COPOLYMER

[75] Inventors: Akinobu Shiga, Tokyo; Masahiro Kakugo, Chiba; Junpei Kozima, Chiba; Kizuku Wakatsuki, Chiba, all of Japan

[73] Assignee: Sumitomo Chemical Company, Limited, Osaka, Japan

[*] Notice: The portion of the term of this patent subsequent to Nov. 5, 2002 has been disclaimed.

[21] Appl. No.: 686,864

[22] Filed: Dec. 27, 1984

[30] Foreign Application Priority Data

Dec. 27, 1983 [JP] Japan .................................. 58-248520
Nov. 15, 1984 [JP] Japan .................................. 59-241086

[51] Int. Cl.[4] ...................... C08L 23/10; C08L 23/14
[52] U.S. Cl. .................................. 525/247; 525/240; 525/268; 525/322; 525/323; 526/308; 526/282
[58] Field of Search ...................... 525/240, 268, 247; 526/308

[56] References Cited

U.S. PATENT DOCUMENTS 3,755,500 8/1973 Clark .................................... 526/308
4,551,501 11/1985 Shiga et al. ........................... 525/89

FOREIGN PATENT DOCUMENTS 1030797 5/1966 United Kingdom .
1104665 2/1968 United Kingdom .

Primary Examiner—Edward J. Smith
Attorney, Agent, or Firm—Sughrue, Mion, Zinn, Macpeak & Seas

[57] ABSTRACT

A process for producing a propylene copolymer having improved transparency and rigidity, which comprises carrying out (A) the polymerization of a vinyl cycloalkane having at least 6 carbon atoms and (B) the polymerization of propylene either alone or with ethylene in a multiplicity of steps in the presence of a catalyst system composed of a titanium compound and an organoaluminum compound. The content of the vinyl cycloalkane unit in the resulting copolymer is 0.05 to 10,000 weight ppm.

8 Claims, 1 Drawing Figure

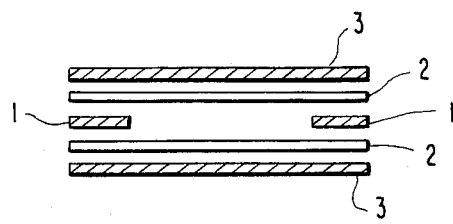

PROCESS FOR PRODUCING PROPYLENE COPOLYMER

FIELD OF THE INVENTION

This invention relates to a process for producing a propylene copolymer having excellent crystallinity.

BACKGROUND OF THE INVENTION

Polypropylene is a synthetic resin which has high rigidity and mechanical strength but of which the rate of crystallization is relatively slow. In some applications, therefore, its crystallinity after molding is low and its rigidity is reduced accordingly because of the formation of relatively large spherulites, molded articles of the polymer have inferior transparency and may have a debased commercial value.

Some attempts have been made heretofore to improve the crystallinity and transparency of polypropylene. For example, it is known that when an aluminum or sodium salt of an aromatic carboxylic acid (Japanese Laid-Open Patent Publication No. 80329/1983) or an aromatic carboxylic acid, an aromatic metal phosphate or a sorbitol derivative (Japanese Patent Publication No. 12460/1980) is added, it becomes an agent for forming a crystal nucleus (to be referred to as a nucleus forming agent), and reduces the aforesaid problem. Among these nucleus forming agents, the sorbitol derivative exhibits a particularly good nucleus forming effect, but is limited in its use because it bleeds out from the resin to contaminate rolls during film formation and give an offensive odor during processing. The aluminum salt of an aromatic carboxylic acid which is frequently used in general acts as a nucleus forming agent, but has a very small effect in improving the transparency of polypropylene. Furthermore, a film formed from polypropylene containing this aluminum salt develops numerous voids.

Japanese Patent publication No. 32340/1970 describes that to improve the transparency of polypropylene, a three-component copolymer is prepared by compolymerizing propylene, an α-olefin having 4 to 18 carbon atoms and 3-methylbutene-1. The transparency of this copolymer is still unsatisfactory.

SUMMARY OF THE INVENTION

The present inventors have made extensive investigations in view of the aforesaid defects of polypropylene, and found that the rigidy and transparency of polypropylene can be improved by copolymerizing propylene with a vinyl cycloalkane. This discovery has led to the present invention.

According to this invention, there is provided a process for producing a propylene copolymer, which comprises carrying out (A) the polymerization of a vinyl cycloalkane having at least 6 carbon atoms and (B) the polymerization of propylene or the copolymerization of propylene with ethylene in a multiplicity of steps using a catalyst system composed of a titanium compound and an organoaluminum compound, to thereby produce a propylene copolymer containing 0.05 weight ppm to 10,000 weight ppm of the vinyl cycloalkane unit.

For example, in the process of this invention, the polymerization (A) of the vinyl cycloalkane is carried out by at least one of the following multistep polymerization procedures.

(1) The vinyl cycloalkane is polymerized in a first step, and propylene is polymerized either alone or with ethylene in a second step.

(2) Propylene is polymerized either alone or with ethylene in a first step and the vinyl cycloalkane is polymerized in a second step.

(3) Propylene is homopolymerized in a first step, the vinyl cycloalkane is polymerized in a second step, and propylene is polymerized alone or with ethylene in a third step.

BRIEF DESCRIPTION OF THE DRAWING

The FIGURE shows a schematic view of a pressing plate to mold a sample sheet for the measurement of optical properties.

DETAILED DESCRIPTION OF THE INVENTION

There is no particular limitation on the content of the vinyl cycloalkane in the copolymer. In order to obtain an improving effect without changing the inherent properties of polypropylene, the proportion of the vinyl cycloalkane unit in the copolymer should be 0.05 weight ppm to 10,000 weight ppm, preferably 0.5 weight ppm to 5,000 weight ppm, more preferably 0.5 weight ppm to 1,000 weight ppm.

Specific examples of the vinyl cycloalkane used in this invention are vinyl cyclopentane, vinyl-3-methyl cyclopentane, vinyl cyclohexane, vinyl-2-methyl cyclohexane, vinyl-3-methyl cyclohexane and vinyl norbornane, with vinyl cyclopentane and vinyl cyclohexane being preferred.

The polymerization (A) of the vinyl cycloalkane may be the homopolymerization of the vinyl cycloalkane or the copolymerization of it with a small amount (i.e., up to 20 mole% per mole of the vinyl cycloalkane) of another vinyl cycloalkane or with an α-olefin such as ethylene, propylene or butene. Examples of another vinyl cycloalkane to be copolymerized with the vinyl cycloalkane are those listed above for the vinyl cycloalkane. Suitable polymerization solvents include the above vinyl cycloalkane monomers themselves and hydrocarbons such as butane, hexane, heptane, benzene and toluene. The polymerization temperature is the same as in the polymerization of α-olefins with conventional Ziegler-Natta catalysts, and is preferably in the range of 20° to 100° C. The polymerization pressure is atmospheric pressure to 60 kg/cm$^2$-G. There is no particular limitation on the amount of the vinyl cycloalkane polymerized per gram of the titanium compound catalyst, but preferably it is 0.01 to 100 g, more preferably 0.1 to 50 g.

The homopolymerization of propylene or the copolymerization of it with ethylene (B) may be carried out by known polymerization methods, for example, by slurry polymerization in a hydrocarbon solvent such as hexane or heptane, bulk polymerization in liquefied propylene, vapor-phase polymerization in a propylene gas, etc. The polymerization temperature is 20° to 100° C., and the polymerization pressure is atmospheric pressure to 60 kg/cm$^2$-G. The copolymerization of propylene with ethylene may be random copolymerization or block copolymerization. In case of the copolymerization of propylene with ethylene, the amount of ethylene copolymerized is up to 50 mole% per mole propylene.

The titanium compound catalyst used in this invention is a Ziegler-Natta catalyst which gives an isotactic polymer, and there can be used titanium trichloride catalysts sold by Toyo Stauffer Co., Ltd., Toho Titanium Co., Ltd., Marubeni-Solvay Co., Ltd., etc. The catalysts comprising a magnesium compound and a titanium compound supported thereon described in, for example, Japanese Laid-Open Patent Publication Nos. 59916/1982 and 135408/1980 can also be conveniently used.

The organoaluminum compound used in this invention is preferably an alkyl aluminum comound represented by the following formula:

$$AlX_aR_{3-a}$$

wherein X represents a halogen atom, an alkoxy group or a hydrogen atom, R represents an alkyl group having 1 to 18 carbon atoms and a is a number represented by $0 \leq a < 3$. Specific examples include $Al(CH_3)_3$, $Al(CH_3)_2Cl$, $Al(CH_3)_2Br$, $Al(CH_3)_2(OC_2H_5)$, $Al(C_2H_5)_3$, $Al(C_2H_5)_2Cl$, $Al(C_2H_5)_2Br$, $Al(C_2H_5)_2(OC_2H_5)$, $Al(C_2H_5)_2(OC_4H_9)$, $Al(C_2H_5)(OC_4H_9)_2$, $Al(C_2H_5)Cl_2$, $Al(C_4H_9)_3$, $Al(C_4H_9)_2Cl$, $Al(C_6H_{13})_3$, $Al(C_6H_{13})_2Cl$ and mixtures thereof.

The amount of the organoaluminum compound used is 0.01 to 100 moles, preferably 0.1 to 50 moles, per gram-atom of titanium, and is 0.01 to 100 millimoles, preferably 0.1 to 50 millimoles, per liter of the solvent and liquid monomers combined.

To increase the stereoregularity of the polymer, it is possible to add an electron donor such as carboxylic acid esters, phosphoric acid esters and silicic acid esters during the polymerization.

The propylene copolymer obtained by the process of this invention can be molded into a variety of products such as sheets, films, containers and fibers by known techniques such as injection molding, pressure forming, vacuum forming, extrusion molding, blow molding and stretching.

As required, all types of additives normally incorporated in polypropylene, such as heat and light stabilizers, antistatic agents, carbon black, pigments and flame retardants, can be added to the propylene copolymer provided by this invention. It is also possible to blend the propylene copolymer of the invention with another polymer such as low-density polyethylene, high-density polyethylene, polybutene and EP (ethylene/propylene) rubber and fillers such as mica and talc.

The following examples illustrate the present invention specifically. It should be understood however that the invention is in no way limited to these examples.

The various properties including the melt index, light scattering index (LSI), haze, gloss, [η] and crystallization temperature shown in these examples were measured by the following examples.

(1) Melt index:
Measured in accordance with JIS K-6758.

(2) [η]:
Measured at 135° C. in tetralin using an Ubbelohde's viscometer.

(3) Crystallization temperature:
Measured at a temperature falling speed of 4° C./min. by means of a differential scanning calorimeter (DSC).

(4) Light scattering index (LSI):
Measured by an LSI tester made by Toyo Seiki K.K. (receiving scattering transmitting light of 1.2° to 3.6°).

(5) Haze:
Measured in accordance with ASTM D1003.

(6) Gloss:
Measured in accordance with ASTM D532-53T.

(7) Total light transmittance:
Measured by ASTM D1746-62T.

(8) Flexural modulus:
Measured in accordance with ASTM D790-66 on a sample having a thickness of 5.0 mm obtained by compression molding in accordance with JIS K-6758.

Samples for the measurement of the optical properties (4) to (7) were prepared in accordance with the pressing temperature, pressure and time conditions indicated in JIS K-6758 by using the pess plate shown in the FIGURE i.e., a resin sample was put into a space surrounded by a 1 mm-thick stainless plate 1 and a 1 mm-thick aluminum plate 2 and then pressed to prepare the sample sheet. A numeral 3 represents a 1 mm-thick stainless steel plate.

EXAMPLE 1

To 100 ml of dehydrated and purified n-heptane were successively added 1.95 g of triethyl aluminum, 675 mg of ethyl p-anisate and 6.0 g of a titanium compound catalyst synthesized in accordance with Example 1 of Japanese Laid-Open Patent Publication No. 59916/1982. The mixed solution was then heated to 50° C., and then 50 ml of vinyl cyclohexane was added. The vinyl cyclohexane was polymerized for 15 minutes. The resulting polymer slurry was washed four times with 200 ml of n-heptane to remove the unreacted vinyl cyclohexane, triethyl aluminum and ethyl p-anisate. The n-heptane was removed from the washed active slurry by distillation under reduced pressure to obtain 7.8 g of a powder of polyvinyl cyclohexane containing the active catalyst. The amount of polyvinyl cyclohexane formed was 0.30 g per gram of the charged titanium compound catalyst.

By using 1.06 g of the vinyl cyclohexane polymerization catalyst, 0.75 g of triethyl aluminum, 0.237 g of methyl p-toluate and 1500 ml of n-heptane, propylene was polymerized in a 5-liter stainless steel autoclave at a temperature of 70° C. under a pressure of 6 kg/cm²-G for 40 minutes using hydrogen in a concentration of 1.5% by volume. After the polymerization, 50 ml of n-butanol was added to stop the polymerization. The polymer slurry was taken out, and filtered to separate the polymer powder from the solvent. The polymer powder was washed with 500 ml of 1N hydrochloric acid and then with methanol until the washings became neutral. The powder was dried and then weighed. Its amount was found to be 840 g. The amount of propylene polymerized was 1030 g per gram of the titanium-containing solid catalyst. The powdery copolymer had an [η] of 1.93 dl/g. The vinyl cyclohexane unit content of the copolymer powder, calculated from the amount of vinyl cyclohexane polymerized per gram of the titanium compound catalyst, was 290 weight ppm.

To 100 parts by weight of the copolymer were added as stabilizers 0.2 part by weight of (2,6-di-tertiary butyl hydroxytoluene) and 0.05 part by weight of calcium stearate and 0.05 part by weight of Irganox ® 1010 (an antioxidant made by Ciba-Geigy AG, tertrakis[methylene-3-(3',5'-di-t-butyl-4-hydroxyphenyl)propionate]methane). They were kneaded for 5 minutes by a hot roll at 190° C. The mixture was melted and compressed by a hot press-forming machine kept at 230° C. Then, it was cooled by a cold press having water at 30° C. circulated therethrough to form a press sheet having a thickness of 1 mm. The resulting press sheet was quite odor-free, and had a haze of 24.0%, an LSI of 1.6% and a gloss of 100%. The crystallization temperature of the copolymer composition was 132.6° C.

COMPARATIVE EXAMPLE 1

Propylene was homopolymerized under the same conditions by using the same fresh titanium compound catalyst as used in Example 1. Polypropylene obtained had a haze of 60.0%, an LSI of 42.0%, a gloss of 73% and a crystallization temperature of 119.0° C.

There was a difference of as large as 13.6° C. between the crystallization temperature of the propylene copolymer obtained in Example 1 and that of the propylene homopolymer obtained in Comparative Example 1. Moreover, the propylene copolymer of Example 1 had better optical properties than the propylene homopolymer of Comparative Example 1. This indicates the superior nucleus forming action of the vinyl cyclohexane polymer.

EXAMPLES 2 TO 6

To 500 ml of dehydrated and purified n-heptane were successively added 7.5 millimoles of diethyl aluminum chloride and 50.4 g of the titanium trichloride catalyst (made by Marubeni-Solvay Co., Ltd.). The mixed solution was heated to 60° C., and thereafter, 70 ml of vinyl cyclohexane was added dropwise and simultaneously polymerized for 90 minutes. There was obtained a catalyst containing 1.09 g of polymerized vinyl cyclohexane per gram of the titanium trichloride catalyst.

Propylene was homopolymerized in the same way as in Example 1 by using this catalyst and diethyl aluminum chloride to obtain a propylene copolymer shown in Table 1.

The optical properties and flexural modulus of the copolymers obtained in these runs are measured as in Example 1, and the results are shown in Table 1.

COMPARATIVE EXAMPLES 2 TO 8

Propylene copolymers obtained in the same way as in Examples 2 to 6 except that the vinyl cyclohexane was changed to the vinyl compounds indicated in Table 1. The optical properties and flexural modulus of the resulting copolymers are shown in Table 1.

TABLE 1

| Example or Comparative Example | Polymer in the First Step | | | Optical Properties | | | | Flexural Modulus (kg/cm²) |
|---|---|---|---|---|---|---|---|---|
| | Vinyl Compound | Melting Point (°C.) | Content (wt. ppm) | [η] (dl/g) | Haze (%) | LSI (%) | Total Light Transmittance (%) | |
| Comparative Example 2 | — | — | — | 2.2 | 64 | 30 | 85 | 15,800 |
| Example 2 | Vinyl cyclohexane | 370 | 2 | 2.1 | 60 | 0 | 83 | 17,500 |
| Example 3 | Vinyl cyclohexane | 370 | 107 | 1.9 | 47 | 0 | 86 | |
| Example 4 | Vinyl cyclohexane | 370 | 411 | 2.3 | 43 | 2 | 75 | |
| Example 5 | Vinyl cyclohexane | 370 | 900 | 2.9 | 30 | 0 | 78 | 18,000 |
| Comparative Example 3 | 3-Methylbutene-1 | 303 | 380 | 1.9 | 74 | 5 | 85 | 16,000 |
| Comparative Example 4 | 3-Methylpentene-1 | 273 | 2,000 | 2.0 | 80 | 3 | 84 | |
| Comparative Example 5 | 4-Methylpentene-1 | 238 | 12,000 | 2.4 | 75 | 20 | 85 | |
| Comparative Example 6 | Vinyl cyclohexene | 418 | 580 | 2.0 | 89 | 2 | 66 | |
| Comparative Example 7 | Allylbenzene | 208 | 7,500 | 2.1 | 95 | 0 | 64 | |
| Comparative Example 8 | — | — | — | 1.3 | 67 | 31 | 88 | 18,600 |
| Example 6 | Vinyl cyclohexane | 370 | 580 | 1.3 | 24 | 4 | 84 | 22,000 |

The data given in Table 1 show that the vinyl cyclohexane polymer in a very small amount shows an effect of improving the optical properties and rigidity of polypropylene; that no correlation is seen between the melting point of the homopolymer of the vinyl compound polymerized in the first step and the transparency of the copolymer; and that 3-methylbutene-1 and 3-methylpentene-1 used in the comparative examples had some improving effect.

EXAMPLE 7 AND COMPARATIVE EXAMPLE 9

In the same way as in Example 2, the propylene/ethylene random copolymer was produced, and it optical properties were measured. The results are shown in Table 2. It is seen that as a result of copolymerizing a small amount of vinyl cyclohexane, the transparency of the propylene/ethylene copolymer increased markedly.

TABLE 2

| Example or Comparative Example | Polymer in the First Step | | | Random Copolymer in the Second Step | | Optical Properties | | | | |
|---|---|---|---|---|---|---|---|---|---|---|
| | Vinyl Compound | Melting Point (°C.) | Content (wt. ppm) | α-Olefin | Content (wt. %) | [η] (dl/g) | Haze (%) | LSI (%) | Total Light Transmittance (%) | Gloss (%) |
| Example 7 | Vinyl cyclohexane | 370 | 434 | Ethylene | 2.1 | 2.1 | 28 | 2 | 80 | 96 |
| Comparative Example 9 | — | — | — | Ethylene | 2.8 | 1.9 | 38 | 46 | 86 | 93 |

In Examples 1 to 7, when vinyl cyclopentane is used instead of vinyl cyclohexane, the same effects can be obtained.

While the invention has been described in detail and with reference to specific embodiments thereof, it will be apparent to one skilled in the art that various changes and modifications can be made therein without departing from the spirit and scope thereof.

What is claimed is:

1. A process for producing a crystalline propylene copolymer, which comprises carrying out in separate steps (A) and (B), (A) the polymerization of a vinyl cycloalkane selected from the group consisting of vinyl cyclopentane, vinyl-3-methyl cyclopentane, vinyl cyclohexane, vinyl-2-methyl cyclohexane, and vinyl norbornane and (B) the polymerization of monomer consisting essentially of propylene or consisting essentially of propylene with ethylene in a multiplicity of steps using a Ziegler-Natta catalyst comprising a titanium compound and organoaluminum compound to thereby produce a propylene copolymer containing 0.05 weight ppm to 10,000 weight ppm of the vinyl cycloalkane unit.

2. A process of claim 1, wherein the process consists of two steps in which the polymerization (A) is carried out in a first step and the polymerization (B) is carried out in a second step.

3. A process of claim 1, wherein the process consists of two steps in which the polymerization (B) carried out in a first step and the polymerization (A) is carried out in a second step.

4. A process of claim 1, wherein the process consists of three steps in which the polymerization (B) is carried out in a first step, the polymerization (A) is carried out in a second step, and the polymerization (B) is carried out in a third step.

5. A process of claim 1, wherein in the polymerization (A), the vinyl cycloalkane is polymerized in an amount of 0.01 to 100 g per gram of the titanium compound.

6. A process of claim 1, wherein said propylene copolymer contains 0.5 weight ppm to 5,000 weight ppm of the vinyl cycloalkane unit.

7. A process of claim 6, wherein said propylene copolymer contains 0.5 weight ppm to 1,000 weight ppm of the vinyl alkane unit.

8. A process of claim 1, wherein said vinyl cycloalkane is vinyl cyclopentane or vinyl cyclohexane.

* * * * *